Patented June 30, 1936

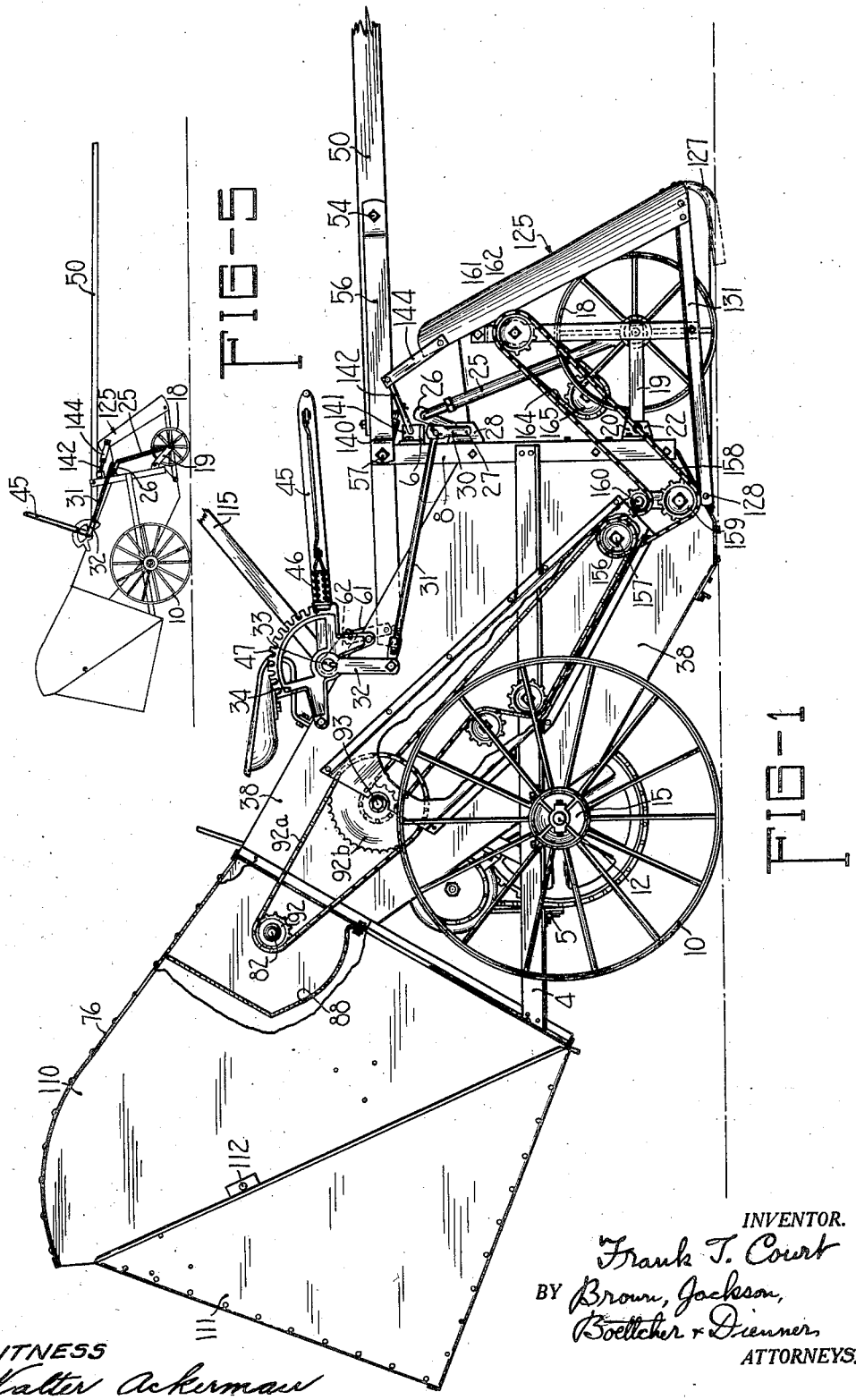

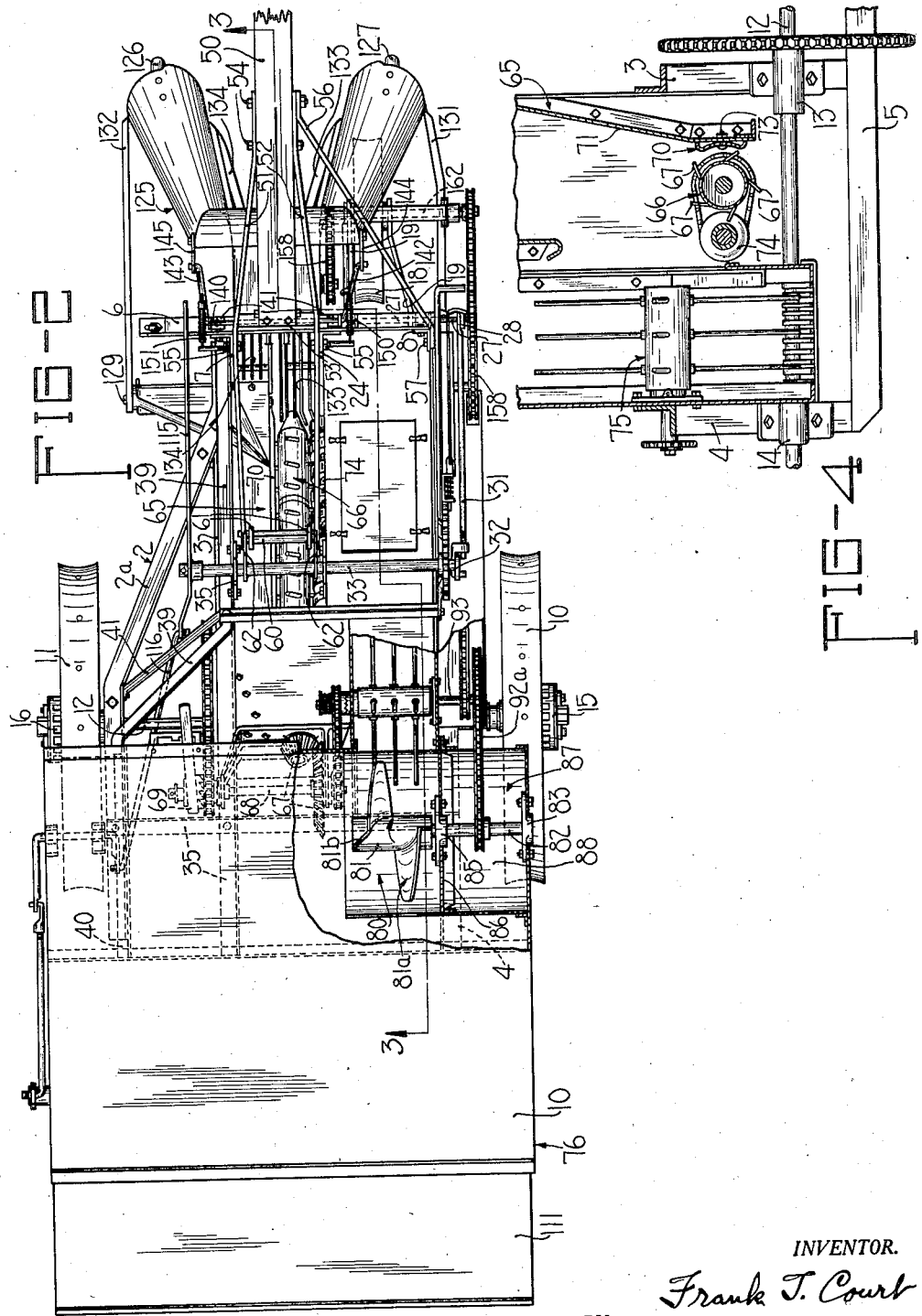

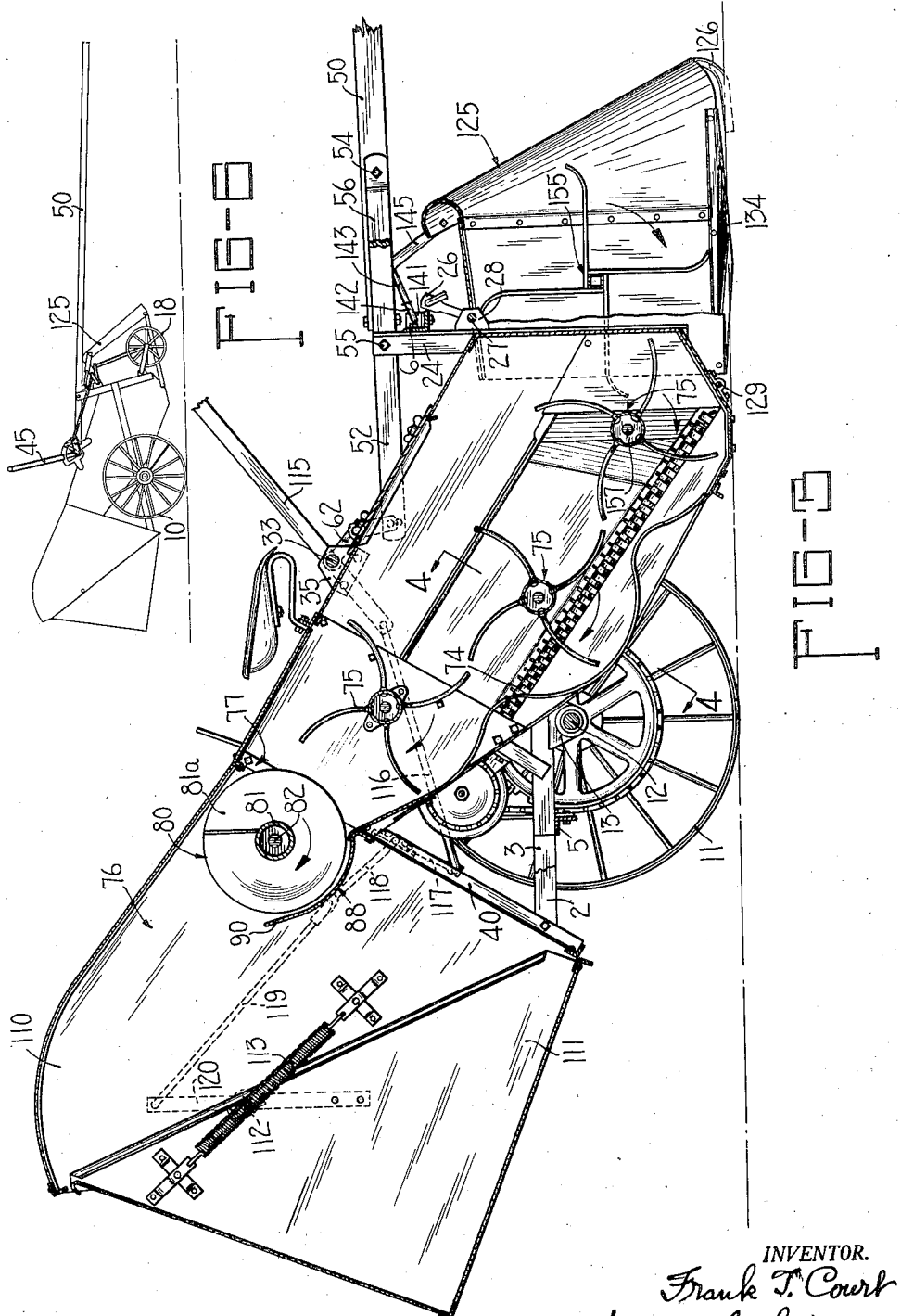

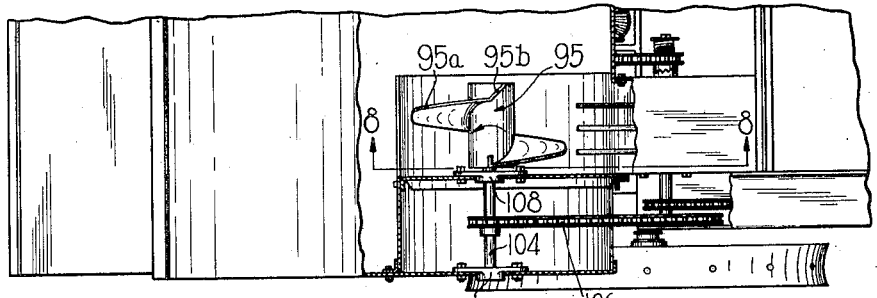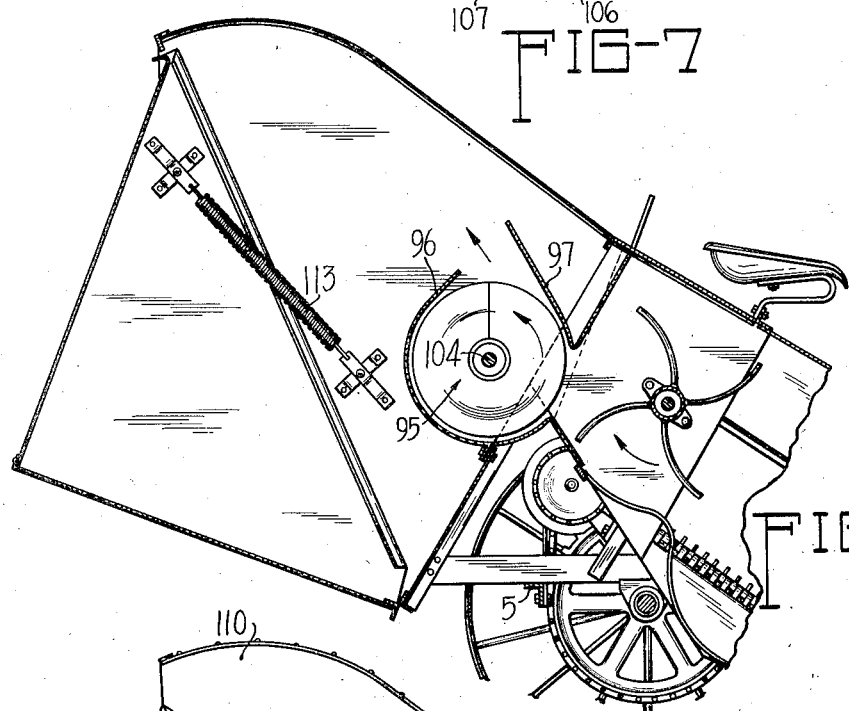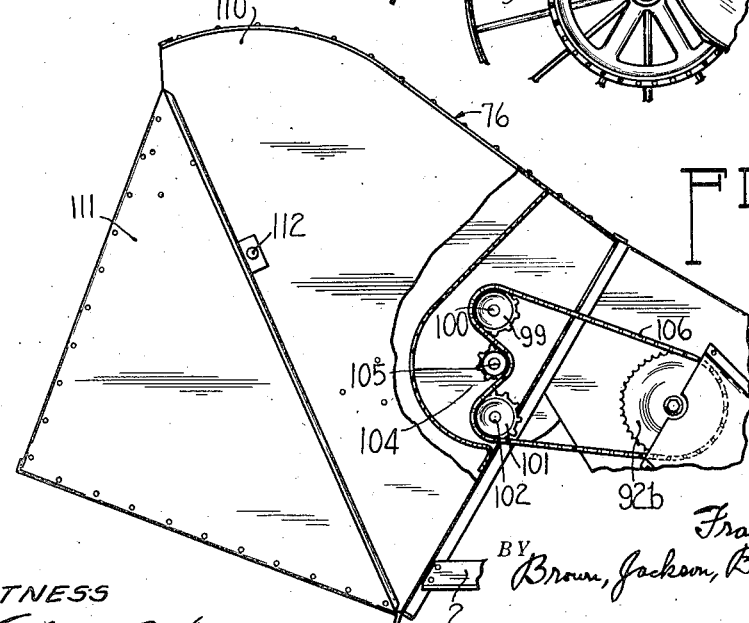

2,045,633

UNITED STATES PATENT OFFICE 2,045,633

AGRICULTURAL IMPLEMENT

Frank T. Court, Moline, Ill., assignor to Deere & Company, Moline, Ill., a corporation of Illinois Application April 30, 1934, Serial No. 723,131

14 Claims. (Cl. 56—10)

The present invention relates generally to agricultural implements and is particularly concerned with certain new and useful improvements in implements of the row following type having operating mechanism whose position relative to the ground is capable of being adjusted.

One of the more important objects of the present invention is the provision of a row following implement with ground engaging supporting means and ground engaging gauge wheel means, in connection with adjusting means therefor which is interconnected with the draft member, by which draft is applied to propel the implement, so that as the implement is adjusted relative to the ground, the draft member is likewise adjusted to accommodate such change in vertical position of the implement.

Another object of the present invention in this connection is the provision of such adjusting means that, during normal operation, the gauge wheel is maintained in a ground engaging position so as to support at least a portion of the weight of the implement, but the arrangement is such that when the implement is to be transported from one field to another, the gauge wheel means is raised out of contact with the ground, this being for the purpose of facilitating the maneuvering of the implement during the transporting operation.

Another important object of the present invention is the provision of a horse drawn implement in which the main portion of the weight of the implement is supported on laterally spaced ground engaging means, such as wheels, and in which very little if any, particularly during the normal operation of the implement, of the weight is imposed on the draft pole or upon the draft animals. In many implements of this sort, a considerable portion on the weight of the implement is disposed forwardly of the ground wheels, and this preponderance of weight is carried by the draft animals, being transmitted thereto through the draft pole and the neck yoke at the forward end thereof. According to the present invention, ground engaging gauge wheel means is provided, and both the gauge wheel and the draft pole are movably connected with the frame of the implement in such a manner that when the implement is adjusted for vertical height, the proper relation is maintained between the draft pole and the gauge wheel means so that the latter continues to serve to relieve the draft animals from the weight of the forward end of the machine and, at the same time, the pole is maintained in proper position relative to the draft animals, and the forward end of the draft pole is not raised or lowered by the operation of raising or lowering the front end of the implement.

Another object of the present invention resides in the provision of a horse drawn row following implement in which the front end of the draft pole supports little or no weight of the implement during the normal operation thereof but is adapted to carry some of the weight of the implement when the latter is arranged in its transport position.

More specifically, an important object of the present invention is the provision of a horse drawn cotton stripper embodying certain of the features mentioned above. In many of the prior horse drawn cotton strippers, no gauge wheel was provided and the machine was at all times, in operation as well as in transport position, supported on its two main carrying wheels and through the neck yoke connected at the front end of the draft tongue. The main supporting wheels were generally positioned so that, even when the hopper at the rear of the machine was full of cotton, there was at least some preponderance of the weight forward so that the draft animals supported at least some portion of the weight of the machine through the neck yoke. This positioning of the wheels however, placed excessive weight on the draft animals when the hopper was empty. Moreover, under certain conditions there was also a tendency for the machine to oscillate vertically about its main supporting wheels, causing the front end to bob up and down with consequent inferior operation and discomfort to the draft animals. Accordingly therefore, another object of the present invention is the provision of a cotton stripper in which a wheel is provided for carrying the weight of the front end of the machine, including the major portion of the weight of the pole when the machine is in operation, with certain interconnections between the gauge wheel and the pole so that when the vertical adjustment of the front end of the implement is effected, the gauge wheel and pole are simultaneously given the proper adjustment also. Preferably, also, these interconnections are such that when the front end of the machine is raised up for transport, the gauge wheel is also lifted free of the ground so that thereafter the machine is supported only on its main carrying wheels and on the draft tongue or pole.

Another object of the present invention is the provision of a new and improved cotton harvesting machine in which the implement carries a cotton receiving hopper and in which the cotton conveying means directs cotton to a spreading device in or adjacent the opening to the hopper for the purpose of delivering the cotton uniformly over different regions of the hopper. The particular utility of a device of this sort lies in the fact that more cotton can be loaded in the hopper than has heretofore been possible. Still further, another object of the present invention is the provision of a cotton spreading device for the hopper of a cotton harvester and in which the spreader preferably takes the form of a cylinder having a spiral vane which, when the cylinder is driven by any suitable means, serves to distribute the cotton to various portions of the hopper. Still further, another object of the present invention is the provision of means serving as a shield for embracing a portion of the distributing cylinder so as to cause the cotton to be thrown in a generally upward and rearward direction.

Another important object of the present invention is the provision of new and improved stripping mechanism for a cotton harvesting implement and, according to the present invention, the cotton stripping mechanism has been improved by the provision of a removable plate with which the radially outwardly extending fingers on the rotating roll cooperate in removing the cotton from the plants as they are drawn in between the removable plate and the rotating roll.

Another object of the present invention is the provision of a plate on the stationary wall which is not only removable but is also curved to conform generally to the curvature of the path of movement of the end of the fingers, and by virtue of this construction the efficiency of the stripping mechanism has been materially increased, since each of the stripping fingers remains in stripping engagement with the plant a longer time than in prior construction, and by virtue of the removability or detachability of the plate, the latter can be removed and replaced when worn. This portion of the stripping mechanism receives rather severe treatment in use. An additional advantage of the detachability of the plate lies in the fact that the plate itself can be made of special long wearing material.

Another object of the present invention is to so construct the plate that the width thereof is substantially equal to the distance between the ends of adjacent stripping fingers as measured in a circumferential direction. By this means, at least one set of stripping teeth is always in closely spaced operative relation with respect to the plate. Not only does this increase the picking efficiency of the stripping mechanism but, also, the space between the stationary plate and the rotating roll is maintained closed at all times so that there is no danger of cotton dropping therebetween.

The above and other objects of the present invention will be apparent to those skilled in the art after a consideration of the following detailed description of the preferred embodiment, taken in conjunction with the accompanying drawings.

In the drawings:

Figure 1 is a side elevation of a horse drawn cotton stripper embodying the principles of the present invention;

Figure 2 is a top plan view of the machine shown in Figure 1, certain portions being broken away to illustrate the spreader device for the hopper;

Figure 3 is a vertical section taken along the line 3—3 of Figure 2;

Figure 4 is a fragmentary section taken approximately along the line 4—4 of Figure 3;

Figure 5 illustrates the machine with the front end raised but with the gauge wheel still in contact with the ground;

Figure 6 shows the machine with both the front end and the gauge wheel raised clear of the ground so that the machine can be easily transported from one place to another;

Figure 7 is a fragmentary top plan view of the right hand end of the hopper, showing a modified form of the cotton spreading device;

Figure 8 is a section taken along the line 8—8 of Figure 7; and

Figure 9 is a fragmentary view, similar to the left hand portion of Figure 1, showing the driving means for the spreading device of Figures 7 and 8.

Referring now more particularly to Figures 1 and 2, the agricultural implement chosen to illustrate the principles of the present invention comprises a cotton stripper having a frame comprising longitudinally extending angle members 2, 3, and 4, the angle members 3 and 4 being parallel, as best shown in Figure 2, while the angle member 2 includes a diagonal section 2a, the front end of the member 2 being connected to the front end of member 3 while its rear portion is laterally spaced therefrom. At their rear ends the frame members 2, 3, and 4 are connected together by means of a cross frame member 5. At their forward ends the frame members 2, 3, and 4 are connected together by means of a cross member 6 bolted to laterally spaced vertical members 7 and 8, the latter being fixed, as by rivets or the like, intermediate their ends to the longitudinal frame members 3 and 4, respectively. The cross member 6, as best shown in Figures 1 and 3, is connected at the upper ends of the vertical members 7 and 8.

The implement frame is supported on two laterally spaced ground engaging supporting means in the form of wheels 10 and 11 journaled on an axle 12. The latter is received in bearings 13 and 14 (Figure 4) secured to the underside of the frame members 3 and 4, and the axle 12 is driven from the supporting wheels 10 and 11 through the usual ratchet mechanisms 15 and 16. The fore and aft spacing of the supporting wheels 10 and 11 is such that these wheels serve to support the principal portion of the weight of the implement and associated parts. However, the preponderance of weight of the implement is forward, and the forward end of the implement is supported when in operation on a front supporting or gauge wheel 18 which is journaled on a spindle fixed to a pair of forwardly extending arms 19 the rear ends of which are mounted on or fixedly secured to a shaft or spindle 20 carried by a pair of brackets 22. The right hand bracket 22 is fixed directly to the vertical frame member 8 and the left hand bracket is secured to an intermediate vertical front bar 24 (Figures 2 and 3), the brackets being fixed to the lower ends of these frame members. The frame member 24 is fixed to and depends from the front cross frame member 6, as best shown in Figure 3.

The arms 19 carrying the gauge wheel 18 are disposed in a generally horizontal position and are capable of being shifted vertically to adjust the position of the gauge wheel relative to the front end of the implement, thereby adjusting the height of operation of the mechanisms supported on the implement. To this end, the inner end of the spindle upon which the gauge wheel is mounted is connected by means of a link 25 with an arm 26 on the inner end of a rock shaft 27 supported in suitable brackets 28, one of the brackets being fixed to the vertical frame member 8 while the other is affixed to the vertical frame member 24. As best shown in Figure 1, the rock shaft 27 is provided with an arm 30 at its laterally outer end and this arm is connected by means of a link 31 with an arm 32 provided on a rock shaft 33. The rock shaft 33 is journaled in a bearing formed integral with a casting member 34 (Figure 1) and in a perforation formed in a bracket 35 (Figure 3). The casting 34 is fixed to the side of a housing 38 which encloses certain portions of the stripping mechanism and is supported by and fixed to the frame of the implement. The bracket 35 is suitably fixed, as best shown in Figure 2, to an angle member 39 which is connected at its forward end to the vertical frame member 7 and at or near its rear end to a downwardly and rearwardly extending angle member 40, the latter being connected at its lower end with the frame member 2. The frame member 39 is braced to the frame member 2 by means of a member 41 which is connected at its lower end to the frame member 2 and extends forwardly and laterally upwardly where it is connected to the member 39.

Since the vertical position of the gauge wheel 18 relative to the front end of the implement is controlled by the rocking of the rock shaft 33, a lever 45 is fixed to this rock shaft and is adapted to be locked in various positions of adjustment by means of a latch 46 cooperating with notches in a sector 47 formed integral with the casting 34. Thus, by releasing the lever 45 and shifting the same to various positions, the gauge wheel 18 can be raised or lowered, relative to the front end of the implement, thereby adjusting the vertical position of the latter as desired. During normal operation, the gauge wheel 18 supports the front end of the implement and the link members 25 and 31 are under compression, the gauge wheel 18 reacting through these links against the frame of the implement in supporting the front end thereof.

The implement is provided with a draft pole or tongue 50 which is connected at its rear end to two spaced members 51 and 52 which, while forming a rigid part of the draft pole, extend rearwardly therefrom and adjacent their intermediate portions carry a transverse brace member 53 fixed between them and to which the rear end of the pole proper or tongue 50 is secured, as by bolting. The forward ends of the members 51 and 52 are bolted, as at 54, to the rear portion of the pole 50, as best shown in Figure 2. The draft tongue assembly 50 is pivotally supported on a frame of the implement by means of pivot bolts 55 which pass through perforations in the members 51 and 52 and perforations in the upper ends of the vertical frame members 7 and 24. The bolts 55 therefore define a pivotal axis about which the draft pole 50 swings relative to the implement frame. The tongue 50 is further braced against lateral movement with respect to the implement frame by means of a diagonal brace member 56 connected to the side of the pole 50 by means of one of the bolts 54. The rear end of the diagonal brace 56 is pivotally connected by means of a pivot bolt 57 to the vertical frame member 8, it being noted from Figure 2 that the pivot bolt 57 is disposed in alignment with the pivotal axis of the tongue as defined by the pivot bolts 55.

The rear ends of the tongue members 51 and 52 are connected together by means of a cross member 60 (Figure 2) and this member is connected by means of a pair of laterally spaced links 61 to a pair of arms 62 fixed in laterally spaced relation to the rock shaft 33 which, as described, controls the vertical position of the gauge wheel 18 relative to the front end of the implement. The position and length of the arms 32 and 62, fixed on the rock shaft 33, and the arms 26 and 30, fixed to the rock shaft 27 controlling the gauge wheel 18, are such that whenever the lever 45 is manipulated to change the vertical position of the front end of the frame for the purpose of varying the height of operation of the stripping mechanism, the angular position of the draft pole 50 in a vertical plane is likewise changed to correspond. The purpose of this arrangement is to maintain the front end of the draft tongue 50 at approximately the same point throughout all height adjustments during the operation of the implement. That is to say, when the lever 45 has been swung from the position shown in Figure 1 to the position shown in Figure 5, the arm 32 will be rocked in a counterclockwise direction, exerting a thrust on the links 31 and 25 and reacting against the gauge wheel 18 to raise the front end of the implement. However, at the same time that the arm 32 on the rock shaft 33 had been swung in a counterclockwise direction, the arms 62, which are connected through the links 61 with the rear end of the draft tongue assembly 50, are also swung in a counterclockwise direction thus swinging the tongue assembly also in a counterclockwise direction about its pivot axis on the implement frame. Therefore, as the front end of the implement is raised the front end of the draft pole 50 is lowered. The relation between the links and arms is such, as mentioned above, that the forward end of the pole is lowered practically the same extent that the front end of the implement is raised. Thus, the vertical height of operation of the stripping mechanism can be varied throughout the range represented by the movement of the lever 45 from the position shown in Figure 1 to the position shown in Figure 5 while, at the same time, keeping the front end of the tongue 50 at about the same level.

Figure 6 represents the implement arranged for transport, and in this position it will be observed that the gauge wheel is entirely free of the ground and has been lifted so that the machine is supported only on its two wheels 10 and 11 and, of course, at the front end of the tongue 50 on the neck yoke. Maneuvering of the implement when arranged in this fashion is much more easily accomplished than when the implement is supported on the gauge wheel 18, particularly since the latter does not caster.

The means by which the gauge wheel 18 is moved downwardly relative to the front end of the frame so as to adjust the vertical position of the latter during normal operation and by which subsequently the implement can be arranged for transport with the gauge wheel clear of the ground is illustrated in Figures 1, 5, and 6. Mention has been made of the fact that when the lever 45 has been moved from the position shown in Figure 1 to the position shown in Figure 5, the gauge wheel has been moved from a position in which the arms 19 are substantially horizontal to a position, representing the raised operating position of the implement, shown in Figure 5 in which the arms 19 extend downwardly at approximately an angle of 45°. During this range of movement it will be observed that the links 25 and 31 are under compression, and in the extreme raised operative position of the implement, illustrated in Figure 5, it will be observed that the arm 32 and link 31 are in alignment. Further counterclockwise movement of the lever 45 toward the position shown in Figure 6 will accomplish two things. First, tension will be placed in the links 31 and 25 to hold the gauge wheel clear of the ground and, second, the arms 62, connected with the rear end of the tongue 50, will continue to raise the rear end of the latter relative to the implement so as to swing the front end thereof downwardly. This end is supported on the neck yoke, and since this is carried by the draft animals, the front end of the implement will be raised and the gauge wheel 18 will likewise be lifted off the ground to an extent depending upon the amount the lever 45 is swung rearwardly from its position shown in Figure 5. The rear group of notches in the sector 47 affords several positions for the lever 45 in the transport range of its movement. Thus, the adjusting lever 45 and associated parts actually serve as three separate means, first as a means for adjusting the vertical position of the front end of the implement on the ground engaging wheel 18, second as a means for simultaneously adjusting the draft member 50 to correspond to the vertical position of the implement, and third as a means for subjecting the tongue 50 to the weight of the front end of the implement to raise not only the implement but also the gauge wheel 18 clear of the ground to arrange the machine for transport.

In the machine, a portion of which has been described above, in which the principles of the present invention have been embodied, the stripping mechanism is similar in many respects to the stripping mechanism shown in the copending application of Frederick A. Thomann, Serial No. 708,796, filed January 29, 1934, now Patent No. 1,978,888, granted October 30, 1934. In general, such stripping mechanism employed in the illustrated machine comprises a generally downwardly and forwardly extending stationary member 65 carried by the implement frame adjacent the frame member 3. Operatively mounted adjacent this stationary member is a stripping roll 66 having fingers 67 mounted thereon in a generally radially extending position, and the roll 66 is driven by a pair of bevel gears 67, the larger of which is mounted on a shaft 68 driven through a clutch mechanism 69 by sprocket and chain means associated with the axle 12, as best indicated in Figures 2. The stationary member 65 carries a removable concave plate 70 secured to the stationary wall plate 71 by any suitable means by which the plate 70 may be detachable, as by bolts 73. From Figure 4 it will be noted that the removable plate 70 is concave and has a width which is substantially equal to the distance between adjacent fingers 67, measured in a circumferential direction. Also, it will be noted that the curved portion of the plate 70 is substantially arcuate about the axis of the roll 66 as a center so that the concave portion lies closely adjacent to the path of movement of the stripping teeth 67. The stripping roll 66 is normally rotated in the direction of the arrow shown in Figure 4 and at its rear end carries a sprocket over which is trained a chain which serves to drive a doffing roll 74 in a manner best described in the copending application identified above.

The stripping mechanism just described removes the cotton from the plants and delivers it to cotton conveying or elevating means in the form of rotatable elevating members 75 which perform a preliminary cleaning operation on the cotton and deliver it into a hopper 76 supported at the hear of the implement frame. The rotatable elevating members 75 are best shown in Figure 3 and the bottom of the housing 38 enclosing the conveying mechanism is in the form of a screen curved to conform generally to the path of movement of the outer ends of the members 75. The rear end of the conveying mechanism communicates with the hopper 76 through a delivery opening 77 toward which the members 75 direct the stripped and preliminarily cleaned cotton. A spreader 80 is disposed in the path of movement of the cotton directed toward and through the opening 77 for the purpose of receiving the cotton from the last elevating member 75 and directing it to different parts of the hopper 76. The spreader 80 comprises a drum 81, as best shown in Figure 2, having a spiral vane 81a fixed thereto, the drum 81 being fixed on a shaft 82 which is journaled in bearings 83 and 84. The bearing 83 is fixed to the outer wall 85 of the hopper and the bearing 84 is supported in a vertical wall 86 forming the inner end of a compartment 87 in which is disposed the drive chain for driving the spreader, as will be described later. The bottom and rear end wall of the compartment 87 is formed by a plate or sheet 88 which is arcuate on its lower side, as best shown in Figure 3, and extends upwardly to the top of the hopper 76 along the rear side of the compartment 87. The bottom of the sheet or plate 88 extends laterally inwardly beyond the wall 86 and forms a shield 90 partially embracing the lower side of the spreader 80, as best shown in Figure 2.

The spreader 80 is rotated clockwise, in the direction of the arrow shown in Figure 3, by means of a driving connection with the last elevating member 75, the driving connection comprising a sprocket 92 fixed on the shaft 82 on which the cylinder 81 is mounted. A driving chain 92a is trained over the sprocket 92 and over a sprocket 92b fixed to the outer end of a shaft 93 upon which the last elevating member 75 is mounted. Rotation of the spreader 80 causes the cotton delivered thereto by the last named elevating member 75 to be directed in a generally upwardly and rearward direction, and since the cotton is not all delivered to the spreader 80 at the same point, some of the cotton is directed practically directly rearwardly while other portions of the cotton are directed rearwardly and laterally, depending upon which portion of the vane 81a strikes the cotton. To cause a substantial portion of the cotton to be directed laterally, the innermost end of the spiral 81a is beveled at a relatively sharp angle, as shown at 81b. The spreader 80 is driven at a relatively rapid rate and serves to spread the incoming cotton uniformly throughout the hopper.

The spreader 80 just described may be termed an undershot spreader, in that the cotton is directed rearwardly to the hopper by the lower sections of the spreader. In Figures 7, 8, and 9 a spreader 95 is shown which is similar to that described above except that it is designed to be rotated in the opposite direction and may, therefore, be designated as an overshot spreader. In this construction, a shield 96 is provided but is extended somewhat farther around the rotatable spreader than the shield 90 described above. Also, a separate shield 97 has been provided and extends over the upper portion of the spreader 95 so as to cause the cotton to be thrown upwardly and rearwardly by the spreader 95. The latter includes a spiral section 95a and an inclined section 95b of practically the same formation as the corresponding parts of the spreader 89 described above except, of course, that the spreader 95 is arranged to rotate in the opposite direction.

In order to obtain a counterclockwise rotation of the spreader 95, the driving connection with the sprocket 92b (see Figure 1) includes an idler sprocket 99 mounted on a stub shaft 100 and a second idler sprocket 101 mounted on a second stub shaft 102. The shaft of the spreader 95 is indicated by the reference numeral 104, and this shaft carries a sprocket 105 over which is trained a driving chain 106. The driving chain is also trained over the sprocket 92b and over the two idlers 99 and 101. As best shown in Figure 7, the shaft 104 is supported in bearings formed in brackets 107 and 108, and these brackets are extended so as to provide a support for the stub shafts 100 and 102.

The hopper 76 is substantially of the same type as the one disclosed in Patent No. 1,933,922 issued November 7, 1933, to Bruce Morse. The hopper 76 includes two pivotally connected sections 110 and 111, the latter being pivoted as at 112 on the former and urged toward closed position by spring means 113. The dumping of the hopper is controlled through a lever 115 journaled on the left hand end of the rock shaft 33, and the lower end of the lever 115 is connected by means of a link 116 to an arm 117 forming a part of a bell crank having a second arm 118 connected through a link 119 to a member 120 riveted or otherwise fixed to the lower section 111 of the hopper. As indicated in Figure 3, when the lever 115 is swung rearwardly, the lower end exerts a pull on the link 116 which swings the bell crank arms 117 and 118 in a counterclockwise direction, and this exerts a pull on the link 119 which, acting through the bracket 120, swings the lower hopper section 111 in a clockwise direction about its pivots 112 on the stationary hopper section 110.

A hood 125 is pivotally connected to the front end of the implement frame and includes ground engaging shoes 126 and 127 which rest on the ground in the lower working positions of the implement. The shoes 126 and 127 serve to support the hood so that the latter follows the inequalities of the ground over which the implement is passing. The hood 125 is in the general form of a rectangular tunnel and is pivotally connected, as aforesaid, to the implement frame at points 128 and 129 by longitudinally disposed bars 131 and 132 connected at their front ends to the lower side portions of the hood 125. The hood 125 carries the grates 133 and 134 for the purpose of directing plants and such cotton as may have fallen on the ground into the stripping mechanism.

The floating movement of the hood about its pivotal connections 128 and 129 is limited by a collapsible connection with the upper transverse frame member 6 by means which comprises a rocking member 140 which is journaled in brackets 141 carried by the frame member 6 and is provided with forwardly extending arms 142 and 143. Links 144 and 145 serve to connect the arms 142 and 143 with the opposite sides of the hood 125.

When the implement is raised into one of its higher operating positions, the arms 142 and 143, and the associated links 144 and 145, assume a position of alignment, as indicated in Figure 5, and any subsequent raising of the implement, as to its transport position shown in Figure 6, also raises the hood 125 bodily therewith. As indicated in Figure 5, the hood 125 is raised off the ground sometime before the gauge wheel 18 is lifted clear of the ground. However, even though the shoes 126 and 127 are on the ground, some of the weight of the front end of the hood 125 is carried by the implement, by virtue of springs 150 and 151 which are connected to the laterally extending ends of the two pivot bolts 55 and to the arms 142 and 143.

The hood 125 is provided with a rotating member 155 journaled therein and is operated by means of a driving connection with a sprocket 156 fixed on a shaft 157 upon which the lower elevating member 75 (see Figure 3) is fixed. Trained over the sprocket 156 is a driving chain 158 trained over idlers 159 and 160 disposed adjacent the pivot 128 and over a sprocket 161 fixed on a jack shaft 162 supported on the frame of the hood 125. The inner end of the jack shaft 162 carries a sprocket, as best shown in Figure 2, over which is trained a driving chain 164 the lower portion of which is trained over a sprocket 165 mounted on the shaft carrying the rotatable member 155. During the operation of the stripper, the rotation of the member 155 keeps the throat of the machine clear of trash and the like.

While I have shown and described above the preferred structure in which the principles of the present invention have been embodied, it will be apparent that my invention is not to be limited to the specific details shown and described above, but that, in fact, widely different means may be employed in the practice of the broader aspects of my invention.

What I claim, therefore, and desire to secure by Letters Patent is:

1. A cotton harvester comprising a rotatable stripping roll having outwardly projecting fingers thereon, a stationary member disposed alongside of said roll at the points where the fingers thereof engage the plants to remove cotton therefrom, said member being concave to conform generally to the curvature of the path of the ends of said fingers and cooperate with the latter in their cotton removing operation.

2. A cotton harvester comprising a rotatable stripping roll having outwardly projecting fingers thereon, a stationary member disposed alongside of said roll in spaced relation thereto, and a plate disposed longitudinally of said roll and detachably connected to said member in the zone where the fingers on said roll engage the cotton plants, said plate being concave to conform generally to the curvature of the path of the ends of said fingers and cooperating with the latter in removing cotton from the cotton plants.

3. A cotton harvester comprising a rotatable stripping roll having outwardly projecting fingers thereon, a stationary member disposed in a generally vertical position alongside of said roll in spaced relation thereto, and means for directing cotton plants into the space between the stripping roll and said member, the latter being concave to conform generally to the curvature of the path of the ends of said fingers so as to cooperate therewith in removing cotton from the cotton plants, the width of said member being substantially equal to the distance between adjacent fingers so as to prevent cotton from falling between the fingers and stationary member during the picking operation.

4. A cotton harvester comprising a rotatable stripping roll having outwardly projecting fingers thereon, a stationary member disposed alongside said roll closely adjacent said fingers in spaced relation with respect thereto, a narrow plate disposed longitudinally of said roll and in between the space between the latter and said stationary member, said plate having a concave section conforming generally to the curvature of the paths of movement of the outer ends of said fingers, and means for directing cotton plants into the space between said narrow plate and said roll so as to be acted upon by said fingers acting in conjunction with said plate.

5. A cotton harvester comprising means for removing cotton from cotton plants, a hopper for receiving said cotton, means for conveying the cotton to said hopper, means for spreading the cotton delivered to said hopper laterally toward different parts of the hopper, and means for driving said spreading means simultaneously with said cotton removing means.

6. A cotton harvester comprising means for removing cotton from cotton plants, a hopper having a receiving opening, means for conveying the cotton to said opening, a spreader in said opening for receiving the cotton from said conveying means and for directing the cotton to different parts of said hopper, and means for driving said spreader from said conveying means.

7. A cotton harvester comprising stripping mechanism for removing cotton from cotton plants, means for driving said stripping mechanism, a hopper having a receiving opening, means for conveying the cotton removed by said stripping mechanism to said opening, a spreader in said opening for receiving the cotton from said conveying means and for directing the cotton to different parts of said hopper, and means for driving both said conveying means and said spreader from the means which drives said stripping mechanism.

8. In a cotton harvester having a frame, a hopper supported at the rear of said frame and having a receiving opening, longitudinally disposed conveying means serving to conduct the cotton toward said opening and comprising a plurality of rotatable elements, a transversely disposed spiral spreader disposed at the rear end of said conveying means and operable to direct the cotton received from said conveying means into different portions of said hopper, and means for driving said spreader from the rear one of said rotatable members.

9. In a cotton harvester comprising a frame and means for removing cotton from cotton plants, the combination of a hopper carried at the rear end of said frame and adapted to receive cotton from said removing means, means for conveying the cotton from said removing means to said hopper and including a generally upwardly and rearwardly disposed bottom wall and rotatable members operating thereover for directing the cotton rearwardly, a rotatable spreader device disposed at the rear end of said conveying means and including a transversely disposed rotatably mounted spiral driven from one of said rotatable members and a shield partially embracing the lower portion of said spiral member and serving as a continuation of the bottom wall of said conveying means, and a second shield disposed above said rotatable spiral member and serving to deflect the cotton laterally and rearwardly into said hopper.

10. In a cotton harvester having a frame and means for removing cotton from cotton plants, the combination of a hopper supported at the rear of said frame and extending from one side of said implement frame to the other, a cotton receiving opening leading into the hopper at one side of said frame, longitudinally disposed conveying means disposed at said one side of said frame and serving to conduct the cotton from said removing means toward said opening, and a spreader disposed at the rear end of said conveying means adjacent said opening and operable to direct the cotton received from said conveying means both rearwardly and toward the portion of said hopper at the other side of said frame.

11. In an agricultural machine, the combination of crop removing and conveying means, a hopper for receiving the crop from said means, and a spreader interposed between the hopper and said means for directing the crop toward different parts of the hopper.

12. In an agricultural machine, the combination of crop removing and conveying means, a hopper for receiving the crop from said means, a movable spreader interposed between the hopper and said means for directing the crop toward different parts of the hopper, and means for actuating said spreader.

13. In an agricultural machine, the combination of crop removing and conveying means, means for driving the latter, a hopper for receiving the crop from said means, a rotatable spreader interposed between the hopper and said means for directing the crop toward different parts of the hopper, and means for driving the spreader from said first driving means.

14. In an agricultural machine, the combination of crop gathering and conveying means, a hopper for receiving the crop from said means, and a spreader interposed between the hopper and said means and comprising a rotating cylinder having a spiral vane thereon and a shield embracing a portion thereof and disposed in the path of movement of the crop acted upon by said conveying means for directing the crop toward different parts of the hopper.

FRANK T. COURT.